Aug. 21, 1934.  W. H. CURTIS  1,970,843
APPARATUS FOR ELIMINATING FREE AIR FROM LIQUID
Filed July 20, 1932
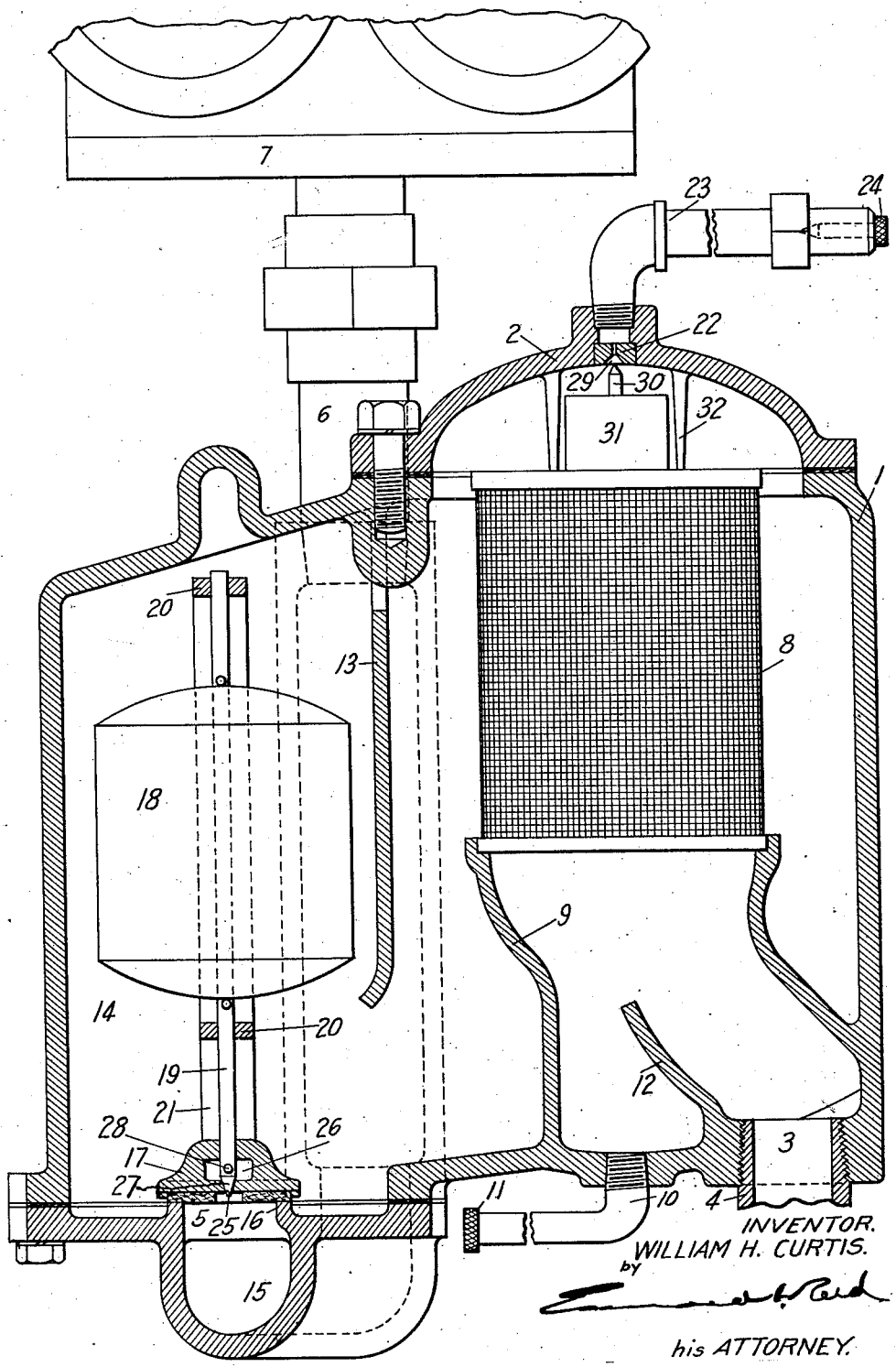
INVENTOR.
WILLIAM H. CURTIS.
by
his ATTORNEY.

Patented Aug. 21, 1934

1,970,843

UNITED STATES PATENT OFFICE 1,970,843

APPARATUS FOR ELIMINATING FREE AIR FROM LIQUID

William H. Curtis, Dayton, Ohio, assignor to National Pumps Corporation, Dayton, Ohio, a corporation of Ohio Application July 20, 1932, Serial No. 623,475

8 Claims. (Cl. 183—2.5)

This invention relates to an apparatus for eliminating free air from liquid and is designed primarily for use in connection with gasoline dispensing pumps of that type in which a flow meter is interposed in the discharge line to measure and record the quantity of gasoline delivered. In such a pump more or less free air will usually enter the discharge line along with the gasoline and in passing through the meter will actuate the same to the same extent that a corresponding quantity of gasoline would actuate the meter, thereby causing the meter to register a quantity of gasoline in excess of the quantity actually delivered. The device shown and described in Patent No. 1,840,079, granted January 5, 1932 to E. H. Bradley, and owned by the assignee of the present application, serves under normal operating conditions to eliminate this free air from the gasoline as the latter passes through the discharge line but under abnormal conditions air may enter the discharge line in quantities greater than can be eliminated by that apparatus and one object of the present invention is to provide means for preventing air from passing through the meter along with the gasoline under such abnormal conditions.

A further object of the invention is to provide in connection with an air eliminator of the type shown in that patent means which will operate when an abnormal quantity of air accumulates in the apparatus to interrupt the delivery of gasoline from the apparatus until a part at least of the air has been removed from the apparatus.

A further object of the invention is to provide such an apparatus which will be simple in its construction and operation and may be produced at a relatively low cost.

Other objects of the invention will appear as the apparatus is described in detail.

The accompanying drawing is a vertical sectional view taken centrally through an apparatus embodying my invention.

In this drawing I have illustrated one embodiment of the invention and have shown the same in connection with an air eliminator of the type disclosed in the aforesaid patent to Bradley but it will be understood that both the invention and the apparatus to which it is applied may take various forms.

In that particular embodiment of the invention here illustrated the apparatus comprises a casing 1 which is closed at its upper end by a dome-shaped cap 2 and is provided near its lower end with an inlet 3 with which is connected a supply pipe 4 which, in the present instance, forms a part of the discharge line leading from the pump. The casing is also provided at its lower end with an outlet 5, this outlet being arranged in a part of the apparatus which will be hereinafter described and being connected with a discharge pipe 6 which leads to a meter 7, with which is also connected a suitable delivery means, such as the usual flexible hose and valved discharge nozzle. This delivery means being of a well known type is not here illustrated. A separating device 8 is arranged within the casing 1 and serves to separate free air from the liquid entering the casing and cause that air to rise to the upper part of the casing. The air which enters the casing will often contain more or less vaporized gasoline and the term "air" as herein used, is intended to include any vapor or mixture of air and vapor which is capable of rising above the level of the liquid. This separator may take various forms and, in the present instance, it is shown as a foraminous cylinder, preferably formed of fine wire mesh and open at its lower end. The upper end of the cylinder may be either open or closed. The separator is here shown as mounted on a flange or wall 9 which extends upwardly from the bottom and side wall of the casing and is so arranged that the inlet 3 lies within the conduit formed by the flange, thus placing the inlet in direct communication with the open lower end of the separator. The relative capacities of the inlet or outlet are such that the liquid will rise in the casing to a level substantially above both the inlet and the outlet. This may be due to a difference in the size of the inlet and the outlet openings or it may result from the usual restrictions in the discharge line, such for example as the valved nozzle. As the gasoline and free air enter the casing the level of the liquid will rise above the lower end of the foraminous cylinder or separator and the liquid will pass through that separator but the liquid which is then contained between the wall of the casing and separator will offer such resistance to the passage of the air through the foraminous wall of the separator that the air will follow the line of least resistance and rise to the top of the casing above the liquid. The air being confined in the upper part of the casing will be placed under pressure by the liquid entering the casing and the height to which the liquid will rise will depend upon the liquid pressure, that is, upon the extent to which the air is compressed within the casing. It is well known that under pressure conditions such as here exist a relatively large amount of air will be absorbed by or dissolved in the gasoline without appreciably increasing the bulk of the liquid. Under normal conditions of operation the gasoline will absorb the air in such quantities that the liquid level will be maintained at such a height above the outlet that no free air will pass through the outlet with the liquid. The casing is provided at its lower end with a drain pipe 10 which is controlled by a manually operated valve 11, and preferably a baffle 12 is arranged at one side of the inlet 3 adjacent to the drain to provide a sump in which solid matter may accumulate and from which such solid matter may be withdrawn through the drain pipe. The apparatus so far described is substantially similar in construction and operation to the apparatus of the Bradley patent above mentioned.

Under abnormal conditions air will enter the casing 1 in quantities greater than can be absorbed by the gasoline and this air will accumulate in the upper part of the casing and will gradually force the level of the liquid down until air will escape through the outlet along with the liquid. This condition may rise from various causes, such as the lowering of the liquid in the storage tank, with which the pump is connected, to a level which will permit air to enter the suction pipe along with the liquid, or a leak in the suction line would permit air to enter the same. To prevent the delivery of air to the meter under such conditions I have provided means for interrupting the discharge of liquid from the casing 1 until the air pressure within the casing has been relieved and the liquid has risen to a proper level therein. This is preferably accomplished by providing the outlet with a float controlled valve which will automatically close before the liquid in the casing falls to a level low enough to permit the escape of air. The valve and its float may take various forms and may be arranged in various ways but, in the present construction the casing 1 is divided into two compartments by a partition 13 which terminates at a point spaced from the bottom of the casing, or is provided near the bottom of the casing with an opening, to establish communication between the two compartments. One of these compartments is connected with the inlet 3 and contains the separator 8, as above described. The other compartment, which is indicated at 14, has the outlet 5 formed in the bottom wall thereof, this outlet communicating with a conduit 15 which leads to the discharge pipe 6. The outlet 5 has a valve seat 16 arranged about the same and a valve member 17 is mounted within the compartment 14 for movement into and out of engagement with the valve seat. This movement is imparted to the valve by a float 18 arranged within the outlet compartment 14 and carried by a rod 19 which is guided in cross bars 20 of a frame 21 and is connected at its lower end with the valve 17. The two compartments of the casing being in open communication the liquid will be maintained at substantially the same level in both compartments and therefore the position of the float 18 will be determined by the level of the liquid in the inlet compartment of the casing. The float is so arranged that when the liquid is at a normal height in the casing the float will hold the valve 17 open and the outlet will be unobstructed but when the liquid falls to a predetermined level the valve will be closed and the discharge of liquid interrupted. The level of the liquid at which the valve will be closed is predetermined at such a height as to prevent any possibility of air passing through the outlet with the liquid.

After the valve has been closed it can be opened only by discharging a portion of the air from the casing and thus permitting the liquid to rise to a higher level. For this purpose the top 1 of the casing is provided with a vent or relief port 22 which communicates with a vent pipe 23 which is provided with a manually actuated valve 24 to control the escape of air through the same. This valve is normally closed so that no air will escape through the vent in the normal operation of the apparatus. When air has accumulated in the casing in excessive quantities and the valve 17 has been closed the vent valve 24 is opened and the air permitted to escape from the casing, thus restoring atmospheric pressure within the casing. When this has been done the vent valve is again closed and the liquid entering the casing from the pump will raise, or tend to raise, the float 18 and thus open the valve 17 for the outlet 5. However, the valve 17 is subjected to the pressure of the liquid and of the air in the casing, which air is again placed under pressure by the rise of the liquid, and this pressure may be so great that the float will not be able to unseat the valve. To permit the opening of the valve under such conditions means are provided for automatically relieving the pressure thereon. For this purpose a relief port 25 is formed in the valve 17 and communicates through a passageway 26 in the valve with the interior of the outlet compartment. This port is preferably tapered to form a valve seat and the lower end of the float rod 19 is tapered, as shown at 27, to form a needle valve which will enter the port 25 to close the same. The rod 19 is so connected with the valve that it may have a limited movement with relation thereto, this being accomplished by slidably mounting the rod in the valve and providing the same with a stop 28 within the passageway 26 and so arranged that when it is in engagement with the top wall of the passageway the port 25 will be open. Thus when the air pressure within the casing has been relieved the float will rise, thereby opening the relief port 25 and permitting liquid to pass through the valve to the outlet conduit 15. Usually the nozzle valve in the discharge line is closed and the discharge line beyond the casing 1 is full of liquid. Consequently the passage of a relatively small quantity of liquid from the casing to the discharge line will so equalize the pressures on the two sides of the valve that it may be raised by the float, thus opening the outlet and restoring the apparatus to full operation.

To prevent the escape of liquid through the air vent 22, in case the manually operated valve 24 should be left open, means are provided for automatically closing that vent before the liquid reaches the same. As here shown, the lower end of the port or vent 22 is enlarged at 29 to form a valve seat adapted to be engaged by a needle valve 30 carried by a float 31 arranged in the upper part of the casing between guides 32 which maintain the needle valve in line with the valve seat. The downward movement of the float 31 may be limited in any suitable manner but, in the present instance, the separator 8 is closed at its top and serves to support the float when the liquid level is below the same. It will be apparent that when the level of the liquid rises above the separator 8 the float will rise and close the vent and will maintain the same closed so long as the liquid remains at the higher level. Should the accumulated air force the liquid level down far enough to open the float valve 30, while the manually operated valve 24 is open, sufficient air will escape to relieve the pressure and permit the liquid level to again rise, thereby closing the float valve.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus for eliminating free air from liquid passing through a discharge line, a casing closed at its upper end and having an inlet and an outlet communicating therewith near the lower end thereof, a device interposed between said inlet and said outlet to prevent air which enters said casing with said liquid from passing with said liquid to said outlet and to cause said air to rise above said liquid, said inlet and said outlet being of such relative capacities that in the normal operation of such apparatus the liquid will rise in said casing to a level above said outlet and will compress the air in the upper part of said casing, the accumulation of air under pressure tending to lower the level of the liquid and means controlled in accordance with the level of the liquid in said casing to interrupt the flow of liquid through said outlet before the liquid falls to a level which would permit air to escape through said outlet.

2. In an apparatus for eliminating free air from liquid passing through a discharge line, a casing closed at its upper end and having an inlet and an outlet communicating therewith near the lower end thereof, a device interposed between said inlet and said outlet to prevent air which enters said casing with said liquid from passing with said liquid to said outlet and to cause said air to rise above said liquid, said inlet and said outlet being of such relative capacities that in the normal operation of such apparatus the liquid will rise in said casing to a level above said outlet and will compress the air in the upper part of said casing, the accumulation of air under pressure tending to lower the level of the liquid, a valve to control the flow of liquid through said outlet, a float operatively connected with said valve, the position of said float being controlled by the level of the liquid in said casing, said valve having a relief port, and means controlled by said float to open said relief port while said valve is closed.

3. In an apparatus for eliminating free air from liquid passing through a discharge line, a casing closed at its upper end and having an inlet and an outlet communicating therewith near the lower end thereof, a device interposed between said inlet and said outlet to prevent air which enters said casing with said liquid from passing with said liquid to said outlet and to cause said air to rise above said liquid, said inlet and said outlet being of such relative capacities that in the normal operation of such apparatus the liquid will rise in said casing to a level above said outlet and will compress the air in the upper part of said casing, the accumulation of air under pressure tending to lower the level of the liquid, means controlled in accordance with the level of the liquid in said casing to interrupt the flow of liquid through said outlet when said liquid falls to a predetermined level, and means for discharging air from the upper part of said casing to permit the liquid to rise therein and cause said means to again establish the flow of liquid through said outlet.

4. In an apparatus for eliminating free air from liquid passing through a discharge line, a casing closed at its upper end and comprising two compartments which communicate one with the other near their lower ends, one of said compartments having an inlet near its lower end and the other of said compartments having an outlet near its lower end, a device arranged in said inlet compartment to separate air from liquid entering said compartment and cause said air to rise to the upper part of said compartment, said inlet and said outlet being of such relative capacities, that in the normal operation of said apparatus the liquid will rise in said casing to a level above said outlet and will compress the air in the upper part of said casing, a float in said outlet compartment, a valve to control the flow of liquid through said outlet, and means for operatively connecting said float with said valve.

5. In an apparatus for eliminating free air from liquid passing through a discharge line, a casing closed at its upper end and comprising two compartments which communicate one with the other near their lower ends, one of said compartments having an inlet near its lower end and the other of said compartments having an outlet near its lower end, a device arranged in said inlet compartment to separate air from liquid entering said compartment and cause said air to rise to the upper part of said compartment, said inlet and said outlet being of such relative capacities that in the normal operation of said apparatus the liquid will rise in said casing to a level above said outlet and will compress the air in the upper part of said casing, a float in said outlet compartment, a valve to control the flow of liquid through said outlet, and means for operatively connecting said float with said valve, said valve having a relief port and said connecting means having a part to close said port when said valve is closed and to open said port before said valve is opened.

6. In an apparatus for eliminating free air from liquid passing through a discharge line, a casing closed at its upper end and comprising two compartments which communicate one with the other near their lower ends, one of said compartments having an inlet near its lower end and the other of said compartments having an outlet near its lower end, a device arranged in said inlet compartment to separate air from liquid entering said compartment and cause said air to rise to the upper part of said compartment, said inlet and said outlet being of such relative capacities, that in the normal operation of said apparatus the liquid will rise in said casing to a level above said outlet and will compress the air in the upper part of said casing, said outlet having an inwardly facing valve seat, a valve movable into and out of engagement with said valve seat and having a relief port, a float in said outlet compartment, an actuating device connected with said float and said valve, having a limited movement with relation to said valve and having a part arranged to close said relief port when said valve engages said valve seat and to open said relief port during the initial upward movement of said float, said casing having an air vent, and manually operated means to control the escape of air through said vent.

7. In an apparatus for eliminating free air from liquid passing through a discharge line, a casing closed at its upper end and comprising two compartments which communicate one with the other near their lower ends, one of said compartments having an inlet near its lower end and the other of said compartments having an outlet near its lower end, a device arranged in said inlet compartment to separate air from liquid entering said compartment and cause said air to rise to the upper part of said compartment, said inlet and said outlet being of such relative capacities that in the normal operation of said apparatus the liquid will rise in said casing to a level above said outlet and will compress the air in the upper part of said casing, said outlet having an inwardly facing valve seat, a valve movable into and out of engagement with said valve seat and having a relief port, a float in said outlet compartment, an actuating device connected with said float and said valve, having a limited movement with relation to said valve and having a part arranged to close said relief port when said valve engages said valve seat and to open said relief port during the initial upward movement of said float, said inlet compartment having an air vent in the top wall thereof, a float in the upper portion of said inlet compartment, a valve actuated by the last mentioned float to open and close said vent, and a manually operated valve to open and close said vent.

8. In an apparatus for eliminating free air from liquid passing through a discharge line, a casing closed at its upper end and having an inlet and an outlet communicating therewith near the lower end thereof, a device interposed between said inlet and said outlet to prevent air which enters said casing with said liquid from passing with said liquid to said outlet and to cause said air to rise above said liquid, said inlet and said outlet being of such relative capacities that in the normal operation of such apparatus the liquid will rise in said casing to a level above said outlet and will compress the air in the upper part of said casing, a float, the position of which is controlled by the level of the liquid in said casing, a valve to control the flow of liquid through said outlet, means controlled by said float to close said valve when the liquid falls to a predetermined level and to relieve the pressure on said valve and then open the same as the liquid rises in said casing, and means to discharge air from the upper part of said casing to permit liquid to rise therein.

WILLIAM H. CURTIS.